(12) United States Patent
Shimizu

(10) Patent No.: US 8,112,814 B2
(45) Date of Patent: Feb. 7, 2012

(54) INFORMATION PROCESSING APPARATUS, ACCESS CONTROL METHOD, ACCESS CONTROL PROGRAM PRODUCT, RECORDING MEDIUM, AND IMAGE FORMING APPARATUS

(75) Inventor: Koji Shimizu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 715 days.

(21) Appl. No.: 11/743,314

(22) Filed: May 2, 2007

(65) Prior Publication Data

US 2008/0235765 A1 Sep. 25, 2008

(30) Foreign Application Priority Data

May 10, 2006 (JP) .................................. 2006-131613
Apr. 26, 2007 (JP) .................................. 2007-117194

(51) Int. Cl.
*G06F 21/00* (2006.01)
*G06F 17/00* (2006.01)
*G06F 7/04* (2006.01)
*H04N 7/16* (2006.01)

(52) U.S. Cl. .................. 726/27; 726/1; 726/2; 713/182; 725/25

(58) Field of Classification Search .................. 713/182; 725/25; 726/1, 2, 27
See application file for complete search history.

(56) References Cited

U.S. PATENT DOCUMENTS

| 5,978,475 | A  | * | 11/1999 | Schneier et al. .............. 713/177 |
| 6,289,458 | B1 | * | 9/2001  | Garg et al. ...................... 726/21 |
| 6,766,314 | B2 | * | 7/2004  | Burnett ................................ 1/1 |
| 7,035,850 | B2 | * | 4/2006  | Arai et al. ............................ 1/1 |
| 7,644,290 | B2 | * | 1/2010  | Ransom et al. ............... 713/194 |
| 7,660,798 | B1 | * | 2/2010  | Ludwig et al. ................ 713/165 |
| 7,827,606 | B2 | * | 11/2010 | Rits et al. ........................ 726/17 |
| 2001/0025311 | A1 | * | 9/2001 | Arai et al. ....................... 709/225 |
| 2004/0023646 | A1 | * | 2/2004 | Inami et al. ................... 455/418 |
| 2004/0025022 | A1 | * | 2/2004 | Yach et al. ..................... 713/176 |
| 2006/0075462 | A1 | * | 4/2006 | Golan et al. ...................... 726/1 |
| 2007/0198462 | A1 | * | 8/2007 | Ohta et al. ......................... 707/1 |

FOREIGN PATENT DOCUMENTS

JP 2005-269619 9/2005

* cited by examiner

*Primary Examiner* — Mohammad Reza
(74) *Attorney, Agent, or Firm* — Oblon, Spivak, McClelland, Maier & Neustadt, L.L.P.

(57) ABSTRACT

A disclosed information processing apparatus to which an application can be added determines whether access to a resource attempted by the application is allowable, based on access control information defining whether the application is given access authority to access the resource. Information regarding the attempted access is saved in a log file in the event that the application attempts to access the resource.

15 Claims, 8 Drawing Sheets

INFORMATION PROCESSING APPARATUS, ACCESS CONTROL METHOD, ACCESS CONTROL PROGRAM PRODUCT, RECORDING MEDIUM, AND IMAGE FORMING APPARATUS

BACKGROUND OF THE INVENTION

1. Field of the Invention

The present invention relates generally to information processing apparatuses, access control methods, access control program products, recording media, and image forming apparatuses, and more particularly to an information processing apparatus, an access control method, an access control program product, a recording medium, and an image forming apparatus provided with a platform for executing a predetermined application.

2. Description of the Related Art

In recent years and continuing, image forming apparatuses are provided with a CPU as in general-purpose computers, although there are considerable restrictions pertaining to memories, etc. Examples of the image forming apparatuses are printers, copiers, scanners, facsimile machines, or multi-function peripherals in which the aforementioned functions are realized in a single housing. These functions are realized under the control of applications.

Some of these image forming apparatuses are provided with a platform for mounting and executing a Java (registered trademark) application. Thus, it is possible to customize an application by adding an application suited to the user's environment after shipment (e.g., Patent Document 1).

Incidentally, the source code of such an application is created by an unspecified person such as a third party vendor or the user. Thus, the person may deliberately or accidentally execute an application that fraudulently accesses a resource in the image forming apparatus.

Meanwhile, in the execution environment of Java (registered trademark), a function is installed for performing access control for each application (each class) with respect to each resource. Access control information (policy) for each application is defined in a policy specification file. There is a mechanism of causing an "exception" in the event that an application attempts to perform an operation that violates the policy. Accordingly, this mechanism ensures the security of the resources. However, if a single application fraudulently accesses the policy specification file and falsifies the contents, the security of the resources cannot be ensured thereafter, which damages the reliability of the image forming apparatus. One approach is to include a definition in the policy definition file that prevents any access to the policy specification file itself.

However, it is inconvenient if the policy specification file is completely prevented from being edited. One approach is to give permission to access the policy specification file to a particular application such as an application for editing the policy specification file, and to authorize only privileged users to execute the particular application.

Patent Document 1: Japanese Laid-Open Patent Application No. 2005-269619

However, it is not possible to ensure that unauthorized users are completely prevented from masquerading as authorized users. Furthermore, the policy specification file is a text file. Therefore, the policy specification file can be easily changed by editing it with a text editor without the editing being prevented by the security function of Java (registered trademark).

SUMMARY OF THE INVENTION

The present invention provides an information processing apparatus, an access control method, an access control program product, a recording medium, and an image forming apparatus, in which one or more of the above-described disadvantages are eliminated.

A preferred embodiment of the present invention provides an information processing apparatus, an access control method, an access control program product, a recording medium, and an image forming apparatus capable of appropriately protecting a file defining security information.

An embodiment of the present invention provides an information processing apparatus to which an application can be added, the information processing apparatus including an access control unit configured to determine whether access to a resource attempted by the application is allowable, based on access control information defining whether the application is given access authority to access the resource; wherein the access control unit saves information regarding the attempted access in a log file in the event that the application attempts to access the resource.

An embodiment of the present invention provides an access control method performed by an information processing apparatus to which an application can be added, the access control method including the step of determining whether access to a resource attempted by the application is allowable, based on access control information defining whether the application is given access authority to access the resource; wherein the determining step includes the step of saving information regarding the attempted access in a log file in the event that the application attempts to access the resource.

An embodiment of the present invention provides an image forming apparatus to which an application can be added, the image forming apparatus including an access control unit configured to determine whether access to a resource attempted by the application is allowable, based on access control information defining whether the application is given access authority to access the resource; wherein the access control unit saves information regarding the attempted access in a log file in the event that the application attempts to access the resource.

According to one embodiment of the present invention, an information processing apparatus, an access control method, an access control program product, a recording medium, and an image forming apparatus capable of appropriately protecting a file defining security information are provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
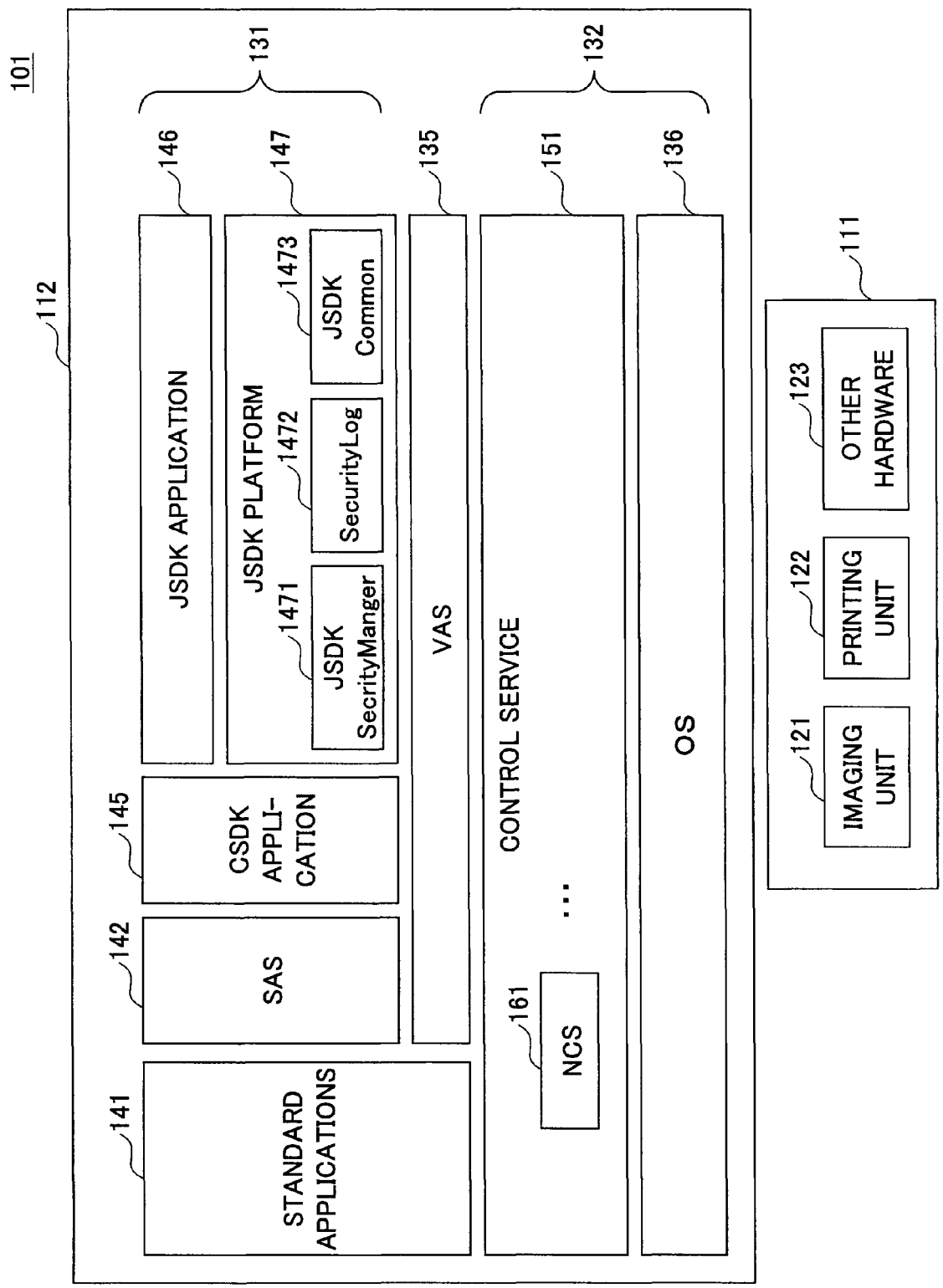
FIG. 1 is a block diagram of a multifunction peripheral according to an embodiment of the present invention.

FIG. 1 is a block diagram of a multifunction peripheral 101 according to an embodiment of the present invention. The multifunction peripheral 101 shown in FIG. 1 is an image forming apparatus taken as an example of an information processing apparatus, and includes various hardware components 111 and various software components 112.

The multifunction peripheral 101 includes hardware 111 such as an imaging unit 121, a printing unit 122, and other hardware 123. The imaging unit 121 is a hardware component for scanning an image (image data) from an original. The printing unit 122 is a hardware component for printing the image (image data) onto a sheet.

The multifunction peripheral 101 includes software 112 such as various applications 131 (in the embodiments of the present invention, an application refers to a computer program designed for realizing a user-requested service with hardware resources of the multifunction peripheral 101) and various platforms 132.

The applications 131 include standard applications 141, an SDK application service (SAS) 142, a CSDK application 145, a JSDK application 146, and a JSDK platform 147.

The standard applications 141 are a group of standard applications installed before shipment, which are for realizing the basic functions of the multifunction peripheral 101 such as a copying function, a printing function, a scanning function, and a facsimile function.

The CSDK application 145 and the JSDK application 146 are applications developed by using dedicated SDKs (software development kits). That is, it is possible to add new applications to the multifunction peripheral 101 after shipment by using the dedicated SDKs. The applications 131 developed by using SDKs are referred to as SDK applications in the present embodiment. As dedicated SDKs, there are provided a "CSDK" for developing an application 131 in the C language and a "JSDK" for developing an application 131 in the Java (registered trademark) language. An application 131 developed by the CSDK is referred to a "CSDK application" (CSDK application 145). An application 131 developed by the JSDK is referred to a "JSDK application" (JSDK application 146).

The JSDK platform 147 is a software component for providing an operating environment for the JSDK application 146 described in the Java (registered trademark) language. For example, the JSDK platform 147 includes a Java (registered trademark) virtual machine, a group of classes provided as standard applications in the Java (registered trademark) ME (Micro Edition), and a group of classes extended for the multifunction peripheral 101 (hereinafter, "extended classes"). A JSDK SecurityManager class 1471, a SecurityLog class 1472, and a JSDK Common class 1473 correspond to the extended classes. Details of theses classes are described below. In the present embodiment, "class" may be referred to as an instance thereof, i.e., an object, as a matter of convenience.

The SAS 142 is a software component for performing activation control, activation cancel control, install control, uninstall control, and update control of an SDK application.

Conventionally, in Windows (registered trademark) applications, each application is accompanied by an installer. However, in the multifunction peripheral 101, the operations of installing and uninstalling all applications are performed by the SAS 142 in an integrated manner. As the applications are installed and uninstalled by the SAS 142 in an integrated manner, the user is not required to carry out different installing operations for each of the applications, i.e., the user's burden in carrying out installing operations is reduced.

The platforms 132 include a control service 151 and an OS 136.

The control service 151 is a group of software modules for providing services for controlling various hardware resources to upper level applications. For example, the control service 151 includes a network control service (NCS) 161 that is activated as a process for providing a service pertaining to network communication.

The OS 136 is a general OS such as UNIX (registered trademark), and activates the above-described software in parallel with each other in units of processes.

In between the applications 131 and the platforms 132, a virtual application service (VAS) 135 is provided as software 112 for mediating the applications 131 and the platforms 132. The VAS 135 operates as a server process with the applications 131 acting as clients, and operates as a client process with the platforms 132 acting as servers. The VAS 135 has a wrapping function of hiding the platforms 132 from the applications 131, and has a role of absorbing the difference in versions caused by upgrading the platforms 132.

Figure 2:
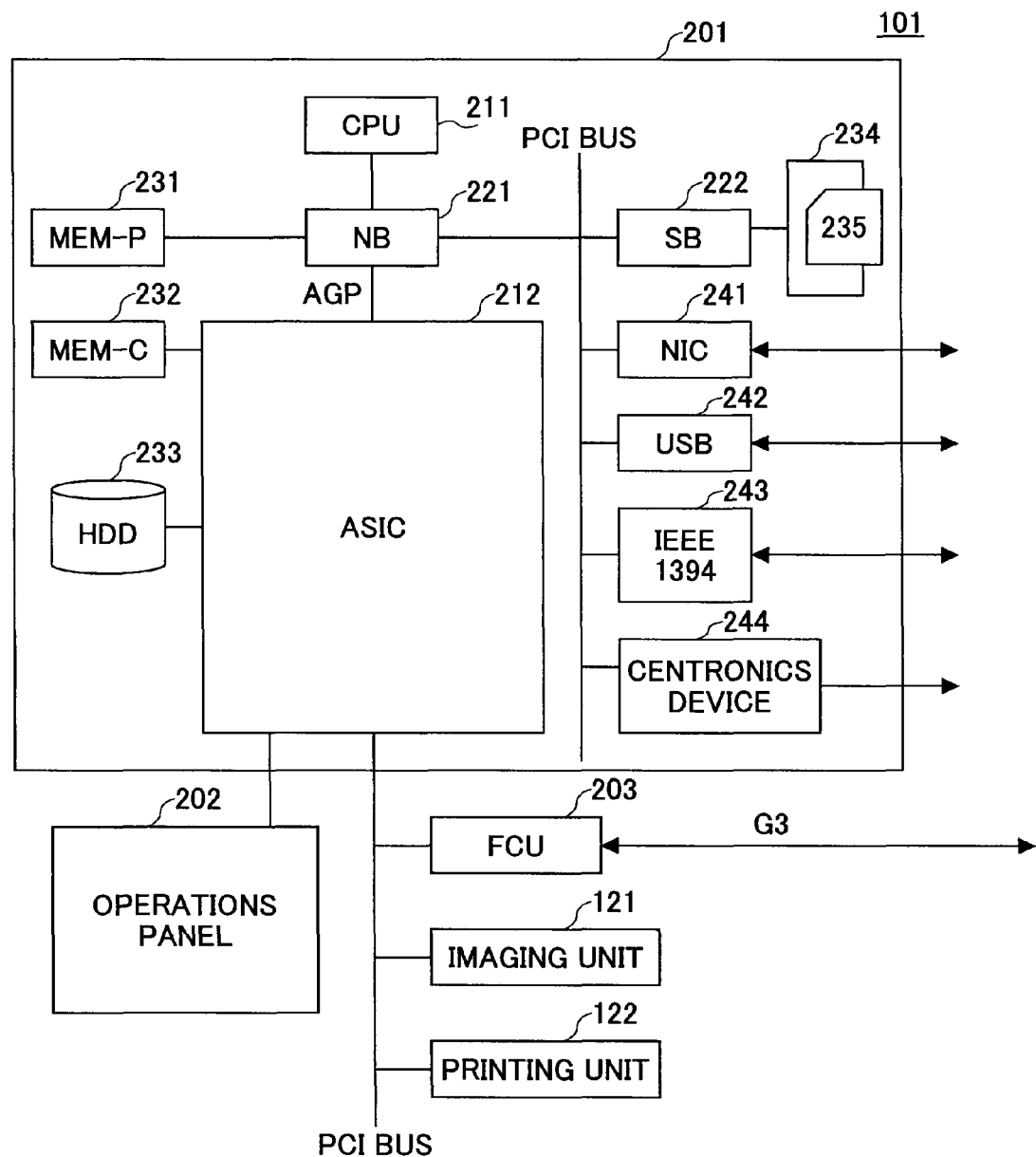
FIG. 2 is a hardware block diagram of the multifunction peripheral shown in FIG. 1.

FIG. 2 is a hardware block diagram of the multifunction peripheral 101. The hardware 111 of the multifunction peripheral 101 includes a controller 201, an operations panel 202, a facsimile control unit (FCU) 203, the imaging unit 121, and the printing unit 122.

The controller 201 includes a CPU 211, an ASIC 212, an NB 221, an SB 222, an MEM-P 231, an MEM-C 232, an HDD (hard disk drive) 233, a memory card slot 234, NIC (network interface controller) 241, a USB device 242, an IEEE 1394 device 243, and a Centronics device 244.

The CPU 211 is an IC for performing various kinds of information processing. The ASIC 212 is an IC for performing various kinds of image processing. The NB 221 is a north bridge of the controller 201. The SB 222 is a south bridge of the controller 201. The MEM-P 231 is a system memory of the multifunction peripheral 101. The MEM-C 232 is a local memory of the multifunction peripheral 101. The HDD 233 is a storage of the multifunction peripheral 101. The memory card slot 234 is a slot for inserting a memory card 235 such as an SD memory card. The NIC 241 is a controller for performing network communications with MAC addresses. The USB device 242 is for providing a connection terminal of the USB specification. The IEEE 1394 device 243 is for providing a connection terminal of the IEEE 1394 specification. The Centronics device 244 is for providing a connection terminal of the Centronics specification.

The operations panel 202 is a hardware component for providing input into the multifunction peripheral 101 (operations unit) and also for obtaining output from the multifunction peripheral 101 (display unit).

The applications 131 shown in FIG. 1 are stored in the HDD 233 and the memory card 235, and are loaded from these recording media into the MEM-P 231 and executed by the CPU 211.

Figure 3:
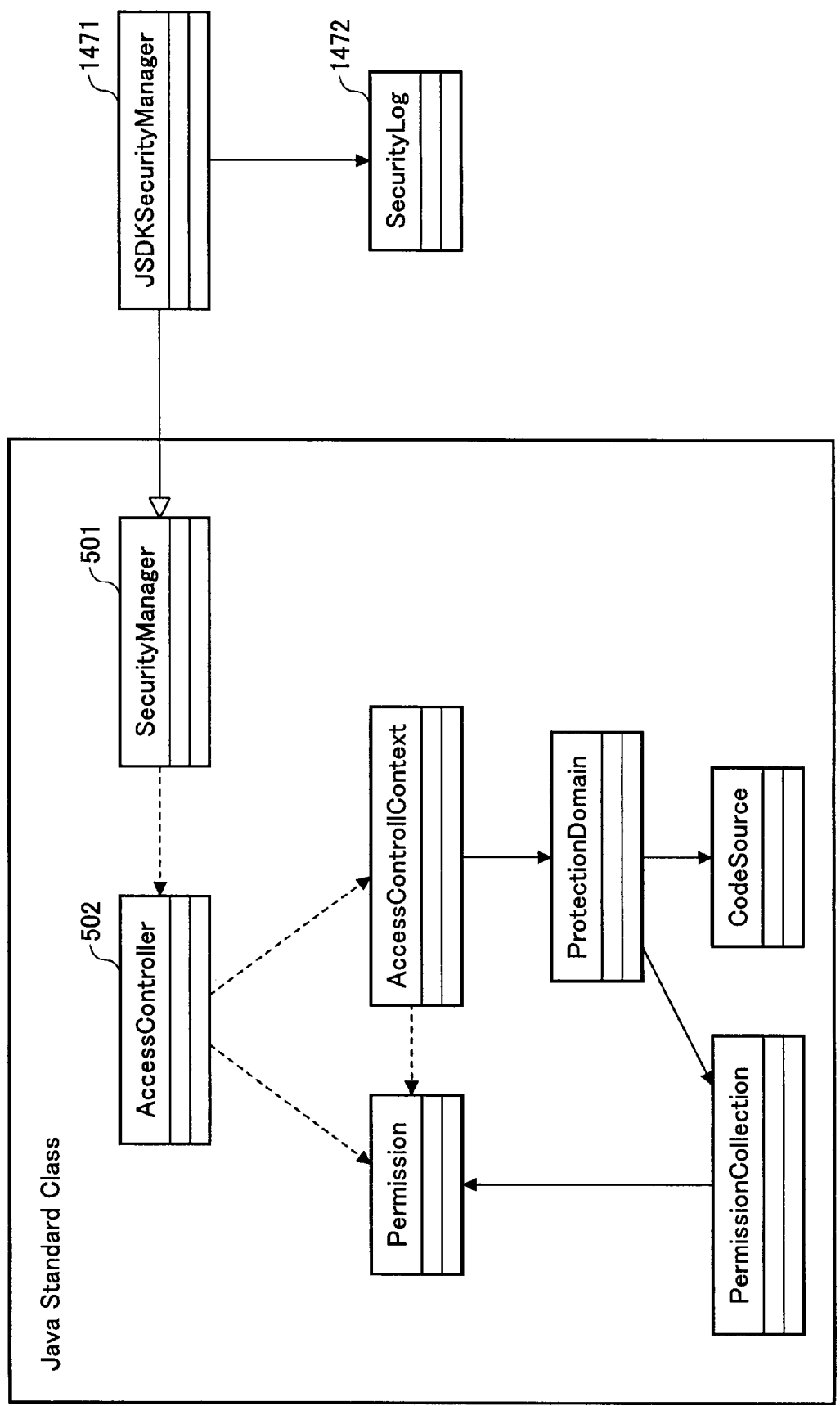
FIG. 3 is a class diagram illustrating relationships between standard classes and extended classes.

Next, extended classes are described. FIG. 3 is a class diagram illustrating relationships between the standard classes and the extended classes. In FIG. 3, the classes included inside the square frame are standard Java (registered trademark) classes.

As shown in FIG. 3, the JSDK SecurityManager class 1471 is a sub class of a SecurityManager class 501. The SecurityManager class 501 is in charge of mediating access to resources such as files, network sockets, and the printer, which is normally a function of the OS. According to the confidence level that the Java (registered trademark) application (hereinafter, simply referred to as "application") has with respect to a class (resource) to be used, the SecurityManager class 501 prevents the application from accessing a class. A policy specification file defines whether an application is authorized to access a resource. Accordingly, the SecurityManager class 501 determines the access authority of each application based on the contents defined in the policy specification file. In the present embodiment, a "resource" does not only correspond to the entity of the resource (hardware, software, etc.), but also includes information (class, object) corresponding to the abstraction of the resource.

The JSDK SecurityManager class 1471 inherits such characteristics from the SecurityManager class 501, and is also uniquely extended. Accordingly, security of the multifunction peripheral 101 is reinforced. For example, every time an access authority is checked (i.e., every time a checkXXX( ) method is called), the SecurityManager class 501 outputs the history (access log) to a log file. Access to the JSDK SecurityManager class 1471 is restricted according to the policy specification file. Therefore, a regular application that is not authorized (in which the restriction is not cancelled) cannot access the JSDK SecurityManager class 1471.

The SecurityLog class 1472 is a class for managing the log file.

Figure 4:
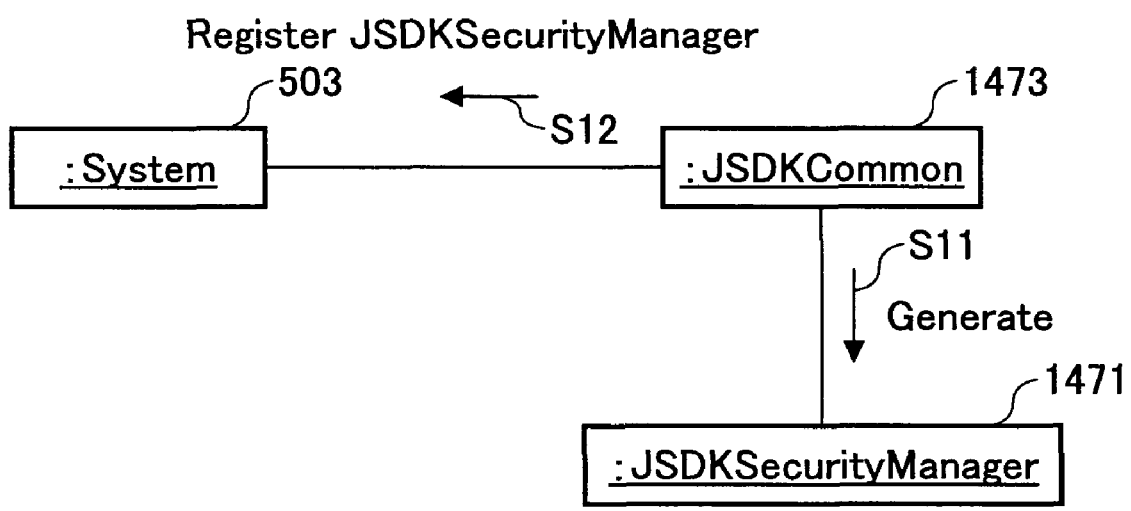
FIG. 4 illustrates a sequence for registering a JSDK SecurityManager object.

Incidentally, in order for the JSDK SecurityManager class 1471 to be effective in the JSDK platform 147, a JSDK SecurityManager object needs to be registered in the System class of Java (registered trademark). This registration is performed by the JSDK Common class 1473. FIG. 4 illustrates the sequence for registering the JSDK SecurityManager object.

As shown in FIG. 4, the JSDK Common class 1473 generates an instance of the JSDK SecurityManager class 1471 (JSDK SecurityManager object) (step S11), and registers the JSDK SecurityManager object in a Java (registered trademark) standard System class 503. Specifically, registration into the System class 503 is performed by calling a set SecurityManager method. The JSDK Common class 1473 starts operating when the JSDK platform 147 is activated. Therefore, the JSDK SecurityManager class 1471 becomes effective as the JSDK platform 147 is activated. That is, after the JSDK platform 147 is activated, the JSDK SecurityManager class 1471 prevents access to the resources based on the policy specification file.

Figure 5:
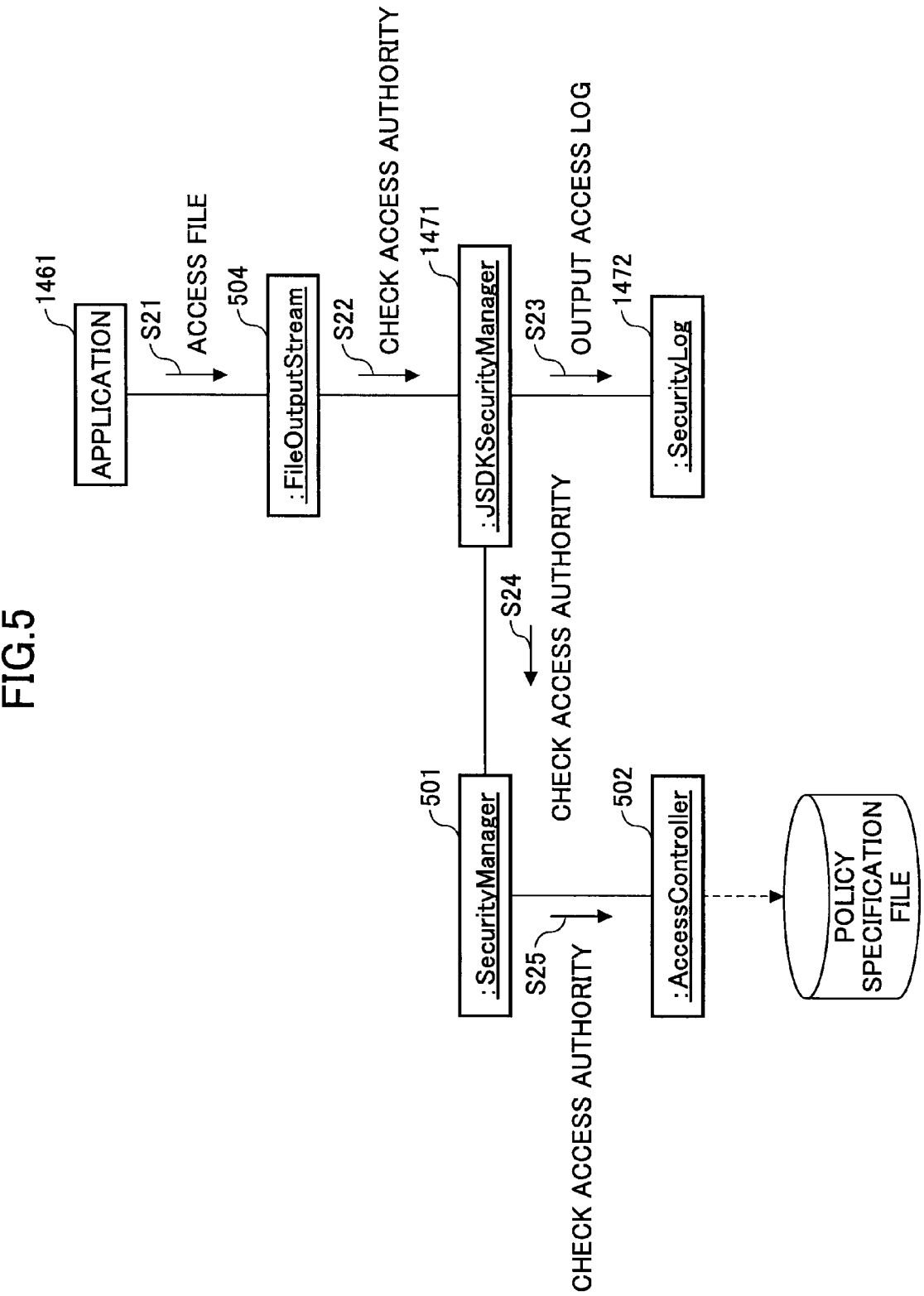
FIG. 5 illustrates messages exchanged between the classes when a file is accessed.

For example, when an application attempts to access a file (write or read), the following messages are exchanged between the classes. FIG. 5 illustrates the messages exchanged between the classes when a file is accessed. In FIG. 5, an application 1461 corresponds to an application installed as the JSDK application 146.

As Java (registered trademark) standard classes for accessing a file, a FileInputStream class and a FileOutputStream class are provided. The FileInputStream class is used for reading a file, and the FileOutputStream class is used for writing in a file. The JSDK platform 147 of the multifunction peripheral 101 also includes these classes.

Accordingly, to write into a predetermined file (for example, "file A"), the application 1461 calls a predetermined method of a FileOutputStream class 504 (step S21). Before the application 1461 writes into the file A, the FileOutputStream class 504 sends a request to the JSDK SecurityManager class 1471 to check whether the application 1461 is authorized to write in the file A (step S22). A message corresponding to step S22 is incorporated as a Java (registered trademark) standard. In step S22, the JSDK SecurityManager class 1471 is called because the JSDK SecurityManager class 1471 is registered beforehand in the System class 503 as described with reference to FIG. 4.

When the request to check the access authority is received, the JSDK SecurityManager class 1471 sends a request to the SecurityLog class 1472 to output an access log showing that the application 1461 is attempting to write into the file A (step S23). In response to this request, the SecurityLog class 1472 outputs an access log to the log file. Details of this process are described below.

In the present embodiment, the JSDK SecurityManager class 1471 delegates the process of outputting the access log to the log file to the SecurityLog class 1472; however, the JSDK SecurityManager class 1471 itself can execute the process of outputting the access log. In the former case, both the JSDK SecurityManager class 1471 and the SecurityLog class 1472 correspond to an access control unit; in the latter case, the JSDK SecurityManager class 1471 alone corresponds to the access control unit.

Next, the JSDK SecurityManager class 1471 sends a request to the SecurityManager class 501, which is the source of the inheritance, to check the access authority based on the policy specification file (step S24). The SecurityManager class 501 delegates the process of checking the access authority to an AccessController class 502 (step S25).

Next, the AccessController class 502 checks the access authority based on the policy specification file. If the application 1461 is not given the access authority, an exception (SecurityException) is issued. Thus, the application 1461 cannot write into the file A. The message corresponding to step S25 and issuance of the exception are mechanisms incorporated as a Java (registered trademark) standard.

Figure 6:
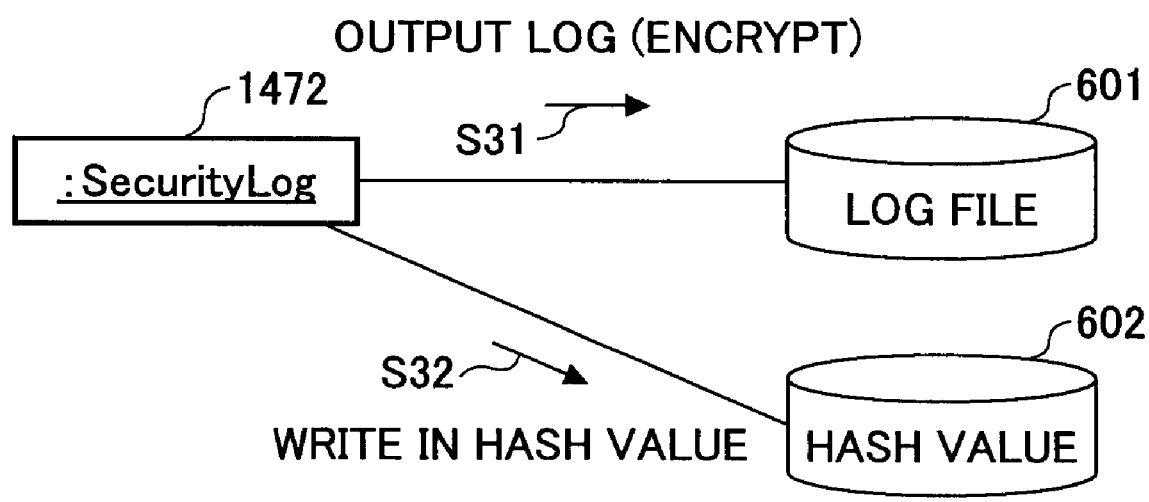
FIG. 6 illustrates a process of outputting an access log performed by the SecurityLog class.

Incidentally, in response to the request to output an access log in step S23, the SecurityLog class 1472 performs the following process. FIG. 6 illustrates the process of outputting an access log performed by the SecurityLog class 1472.

When a request to output an access log is received from the JSDK SecurityManager class 1471, the SecurityLog class 1472 outputs an access log to a log file 601 and encrypts the log file 601 (step S31). By encrypting the log file 601, it is possible to prevent an unspecified person from referring to the access log. The access log records, for example, the device number (a number unique to the multifunction peripheral 101), the access time and date, the access type, the product ID of the application that attempted the access (ID unique to the application), and the access results (successful or unsuccessful).

Next, the SecurityLog class 1472 generates a hash value 602 of the log file 601 (either before or after being encrypted) with a predetermined hash algorithm, and saves the hash value 602 in association with the log file 601 (step S32). Thus, every time the log file 601 is renewed, the hash value 602 is also renewed. Accordingly, it is possible to detect whether the log file 601 has been falsified.

The log file 601 and the hash value 602 are saved in the HDD 233 or the memory card 235. The policy specification file preferably defines that authority to access the log file 601 is not to be given to any application other than the SecurityLog class 1472.

Figure 7:
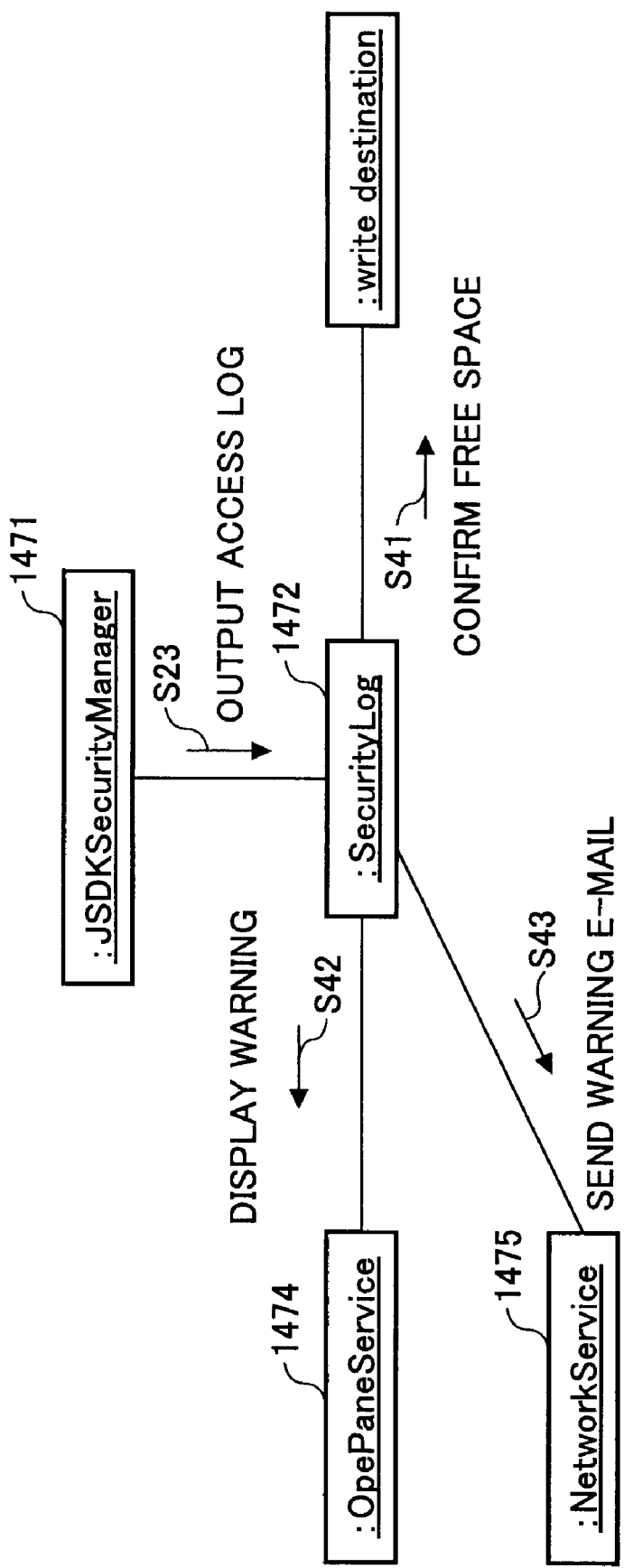
FIG. 7 illustrates a process performed when there is no free space in a write destination for saving the access log.

For example, when there is no free space for saving the access log in the write destination (the HDD 233 or the memory card 235), the SecurityLog class 1472 performs the following process. FIG. 7 illustrates a process performed when there is no free space in the write destination for saving the access log.

When a request to output an access log is received from the JSDK SecurityManager class 1471 (step S23), the SecurityLog class 1472 confirms whether there is any free space in the write destination (step S41). When there is no free space, the SecurityLog class 1472 sends a request to an OpePaneService class 1474 to display a warning on the operations panel 202 (step S42) and sends a request to a NetworkService class 1475 to send a warning e-mail to the administrator (step S43). By displaying a warning message on the operations panel 202 and sending a warning e-mail, it is possible to make the administrator, etc., recognize that there is no free space. Accordingly, the security function based on the log file 601 can be prevented from being damaged.

The OpePaneService class 1474 and the NetworkService class 1475 are for providing an API (Application Program Interface) for the functions of the multifunction peripheral 101, and are included in the JSDK platform 147. The former provides an API regarding display control for the operations panel 202, and the latter provides an API regarding network communications.

Next, an editing process of the policy specification file is described. The policy specification file defines access control information with respect to resources for each application (class), and is thus preferably not easily edited. The following describes how security of the policy specification file is ensured by each of the above-described classes.

Figure 8:
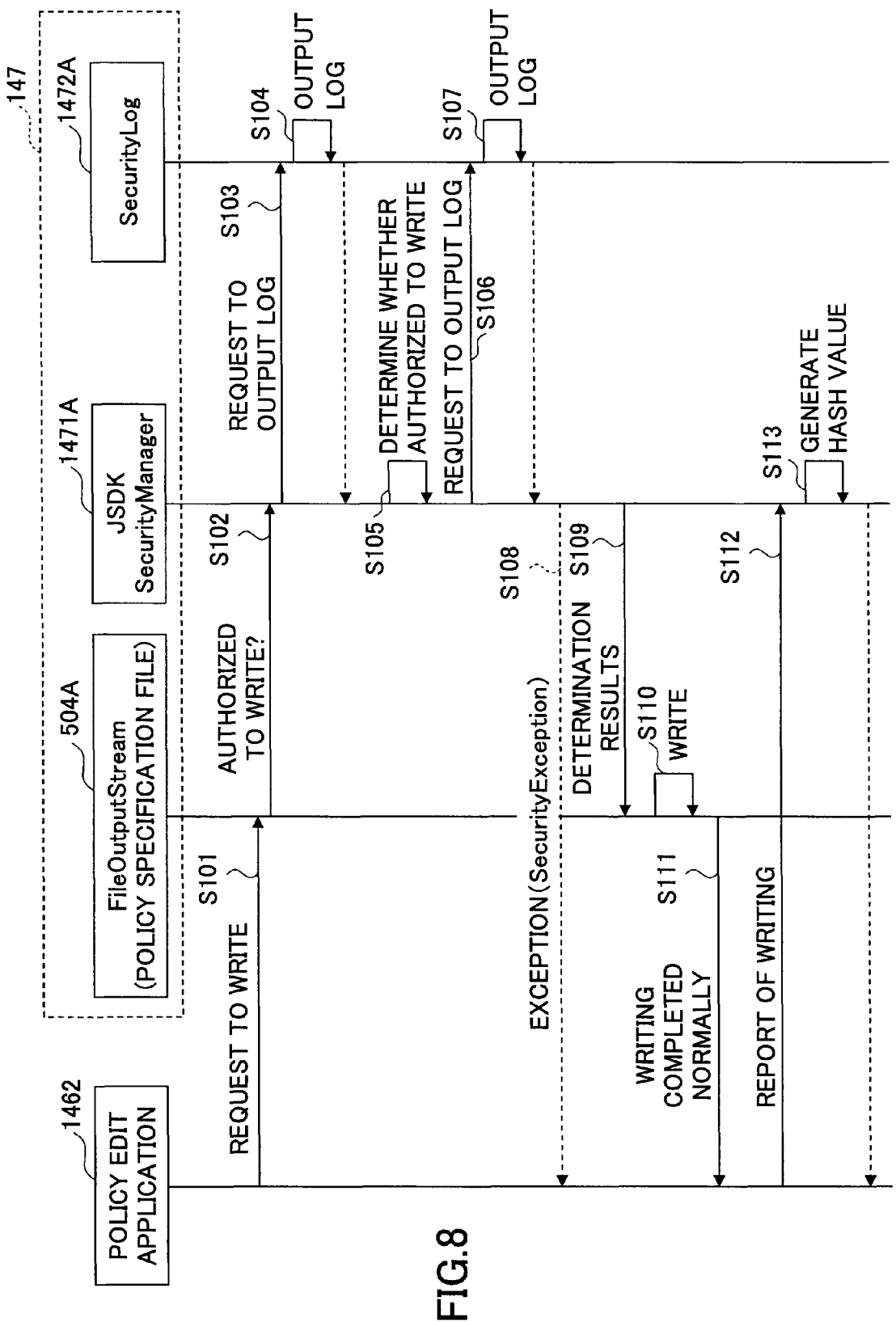
FIG. 8 illustrates a sequence of a process of editing a policy specification file.

FIG. 8 illustrates the sequence of the process of editing the policy specification file. In FIG. 8, a policy edit application 1462 is a JSDK application 146 for providing a function of editing the policy specification file. Only privileged users such as the administrator are authorized to use the policy edit application 1462. The usage authority is defined in access control information for each user (access role information), separately to the policy specification file. Accordingly, a user that is authenticated as the administrator (for example, a user that correctly inputs the administrator's password) is authorized to use the policy edit application 1462.

Furthermore, in the policy specification file, it is defined that the policy edit application 1462 is given the access authority to access (read and write) the policy specification file.

When the authenticated user inputs an instruction to change a policy via the operations panel 202 or a screen displayed by the policy edit application 1462 on the display unit of a client PC connected to the multifunction peripheral 101 via a network, the policy edit application 1462 sends a request to a FileOutputStream object 504A corresponding to the policy specification file to write in the contents to be changed (step S101). That is, similar to the other files, the policy specification file can be accessed via the FileOutputStream class 504.

As described with reference to FIG. 5, in response to the write request, the FileOutputStream object 504A sends a request to a JSDK SecurityManager object 1471A to check whether the policy edit application 1462 is authorized to write into the policy specification file (step S102). The JSDK SecurityManager object 1471A first sends a request to a SecurityLog object 1472A to output an access log that the policy edit application 1462 is attempting to write into the policy specification file (step S103). In response to the request, the SecurityLog object 1472A outputs an access log to the log file 601 (step S104). At this point, as described with reference to FIG. 6, the renewed log file 601 is encrypted, and the hash value of the renewed log file 601 is saved.

Subsequently, the JSDK SecurityManager object 1471A determines whether the policy edit application 1462 is authorized to write into the policy specification file, based on the policy specification file (step S105). More specifically, as described with reference to FIG. 5, the process of making this determination is delegated to the AccessController class 502; however, this is omitted here for the sake of simplicity. Next, the JSDK SecurityManager object 1471A sends a request to the SecurityLog object 1472A to output the determination results as an access log (step S106). As described with reference to FIG. 6, the SecurityLog object 1472A outputs an access log (step S107).

Next, the JSDK SecurityManager object 1471A returns the determination results to the FileOutputStream object 504A (step S109). As described above, the policy edit application 1462 is given the authority to access the policy specification file, and therefore, a message to this effect is returned in step S109. If an application other than the policy edit application 1462 attempts to access the policy specification file, the JSDK SecurityManager object 1471A issues an exception (SecurityException) (step S108). Thus, an application other than the policy edit application 1462 cannot access the policy specification file.

Next, the FileOutputStream object 504A writes the contents to be changed into the policy specification file as requested by the policy edit application 1462 (step S110), and reports to the policy edit application 1462 that the requested process has been completed normally (step S111).

Next, the policy edit application 1462 reports that it has accessed the policy specification file to the JSDK SecurityManager object 1471A (step S112). This report is performed via an extended method in the JSDK SecurityManager object 1471A.

In response to the report from the policy edit application 1462, the JSDK SecurityManager object 1471A generates a hash value of the changed policy specification file, and saves the hash value in association with the policy specification file (step S113). Accordingly, it can be detected as to whether the policy specification file has been falsified with a text editor. This detection is possible because if the policy specification file were changed without being mediated by the JSDK SecurityManager object 1471A, the hash value of the policy specification file after being changed would not be the same as the saved hash value.

As described above, in the multifunction peripheral 101 according to an embodiment of the present invention, the policy specification file can be appropriately protected from applications other than the policy edit application 1462. That is, when an application other than the policy edit application 1462 attempts to access the policy specification file, an exception is issued. Furthermore, when changes are made in the policy specification file with a text editor, it is possible to detect such a change, based on the hash value of the policy specification file.

Furthermore, the JSDK SecurityManager class 1471 outputs an access log every time a resource is accessed. Accordingly, if an unauthorized user attempts to masquerade as an authorized user to use the policy edit application 1462, it is possible to detect and trace such an attempt with the access log. Furthermore, by announcing that an access log is employed, it is possible to psychologically discourage an unauthorized user from masquerading as an authorized user.

Moreover, the access log is encrypted and a hash value is generated, and therefore, it is possible to prevent or detect falsification.

In the case of an image forming apparatus such as the multifunction peripheral 101, a single apparatus is typically shared by plural users. In such a case, it is particularly important to ensure security in the above-described manner, even more so than the case of an information processing apparatus such as a PC (personal computer) where a single apparatus is typically used only by a single user.

The present invention is not limited to the specifically disclosed embodiment, and variations and modifications may be made without departing from the scope of the present invention.

The present application is based on Japanese Priority Patent Application No. 2006-131613, filed on May 10, 2006, and Japanese Priority Patent Application No. 2007-117194, filed on Apr. 26, 2007, the entire contents of which are hereby incorporated by reference.

What is claimed is:

1. An information processing apparatus to which a software application can be added, the information processing apparatus comprising:
   a CPU connected to a memory;
   an access control unit, under control of the CPU, configured to determine whether access to a resource attempted by the software application is allowable, based on access control information defining whether the software application is given access authority to access the resource; and
   a security manager configured to mediate access to the resources by the software application based on an access authority assigned to the software application in a policy specification file, wherein:
   the access control unit saves information regarding the attempted access in a log file in the event that the software application attempts to access the resource
   the security manager communicates with an extended subclass security manager to output a history of access logs, to be stored a security log file through a security log manager, every time an access authority is checked wherein the access history stored in the security log file includes a time of the attempted access, a product ID of the software application attempting the access, and a result of the access attempt, and
   the extended subclass security manager is capable of directly outputting the history of access logs to the security log file wherein the extended subclass security manager and the security log manager are configured to encrypt the security log file.

2. The information processing apparatus according to claim 1, wherein:
   the access control unit saves a hash value of the information saved in the log file.

3. The information processing apparatus according to claim 1, wherein:
   the access control unit encrypts the log file.

4. The information processing apparatus according to claim 1, wherein:
   the access control unit saves, in the event that the application changes the access control information, a hash value of the changed access control information.

5. The information processing apparatus according to claim 1, wherein:
   when the software application attempts to access the resource, the resource is configured to send a request to the access control unit to determine whether the software application is given the access authority to access the resource; and
   in response to receiving the request from the resource, the access control unit saves, in the log file, information regarding the attempted access, and determines whether the attempted access is allowable based on the access control information.

6. The information processing apparatus according to claim 1, wherein, when it is determined that the security log file it out of free space to store the history of log access, a warning is displayed on a display panel and an electronic message is sent to an appropriate address.

7. An access control method performed by an information processing apparatus, including a CPU connected to a memory, the access control method comprising:
   adding a software application to the information processing apparatus; determining, under control of the CPU, whether access to a resource attempted by the software application is allowable, based on access control information defining whether the software application is given access authority to access the resource;
   mediating access, via a security manager, to the resources by the software application based on an access authority assigned to the software application in a policy specification file;
   communicating, via the security manager, with an extended subclass security manager to output a history of access logs, to be stored a security log file through a security log manager, every time an access authority is checked, the extended subclass security manager being capable of directly outputting the history of access logs to the security log file wherein the access history stored in the security log file includes a time of the attempted access, a product ID of the software application attempting the access, and a result of the access attempt,
   wherein the determining step comprises saving information regarding the attempted access in a log file in the event that the software application attempts to access the resource; and
   encrypting, via the extended subclass security manager or the security log manager, the security log file.

8. The access control method according to claim 7, wherein:
   the determining step comprises saving a hash value of the information saved in the log file.

9. The access control method according to claim 7, wherein:
   the determining step comprises encrypting the log file.

10. The access control method according to claim 7, wherein:
    the determining step comprises saving, in the event that the software application changes the access control information, a hash value of the changed access control information to enable detection of an unauthorized change to the access control information via an external agent.

11. The access control method according to claim 7, wherein the determining step comprises:
    receiving a request from the resource to determine whether the software application is given the access authority to access the resource in the event that the software application attempts to access the resource; and
    saving in the log file, in response to receiving the request from the resource, information regarding the attempted access, and determining whether the attempted access is allowable based on the access control information.

12. The access control method according to claim 7, further comprising:
displaying a warning on a display panel and sending an electronic message to an appropriate address when it is determined that that the security log file it out of free space to store the history of log access.

13. The access control method according to claim 7, further comprising:
detecting an unauthorized attempt to the resource, masquerading as an authorized attempt, by outputting the history of access logs every time access is attempted to a resource.

14. A non-transitory computer-readable recording medium that stores therein an access control program product, which, when executed by the CPU, causes the information processing apparatus to perform the method according to claim 7.

15. An image forming apparatus, comprising:
a memory;
a CPU connected to the memory, to which a software application can be added; an access control unit, under control of the CPU, configured to determine whether access to a resource attempted by the software application is allowable, based on access control information defining whether the software application is given access authority to access the resource; and
a security manager configured to mediate access to the resources by the software application based on an access authority assigned to the software application in a policy specification file, wherein:
the access control unit saves information regarding the attempted access in a log file in the event that the software application attempts to access the resource~
the security manager communicates with an extended subclass security manager to output a history of access logs, to be stored a security log file through a security log manager,
every time an access authority is checked wherein the access history stored in the security log file includes a time of the attempted access, a product ID of the software application attempting the access, and a result of the access attempt, and
the extended subclass security manager is capable of directly outputting the history of access logs to the security log file wherein the extended subclass security manager and the security log manager are configured to encrypt the security log file.

* * * * *